Aug. 7, 1945. O. C. TRAVER 2,381,527
PROTECTIVE APPARATUS
Filed July 31, 1941 3 Sheets-Sheet 1
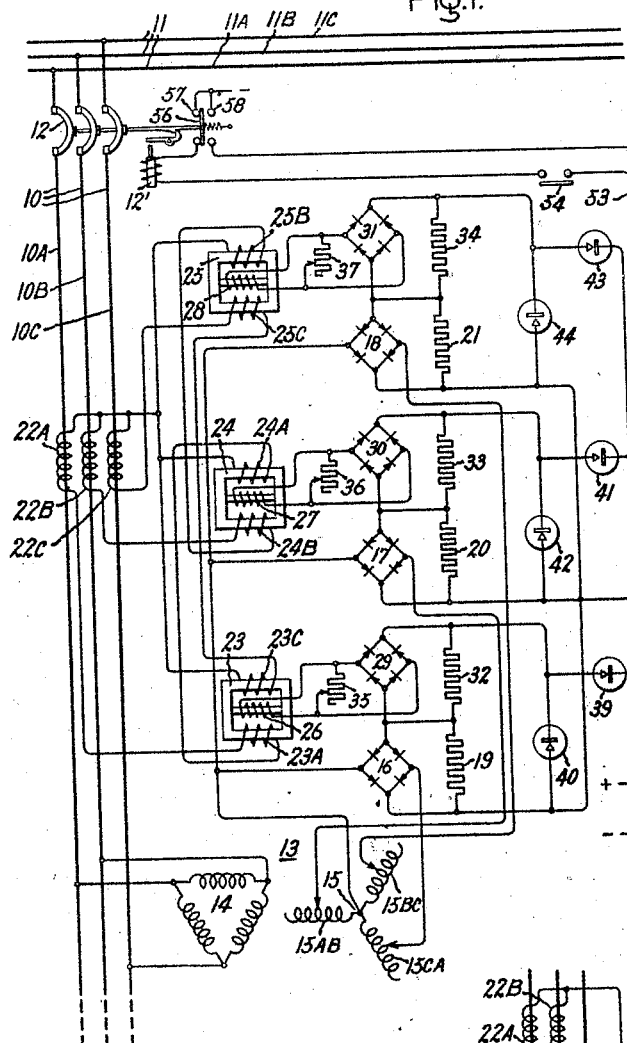
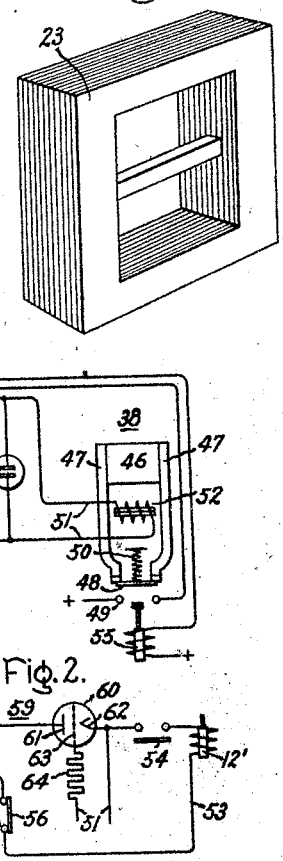
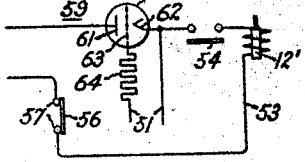
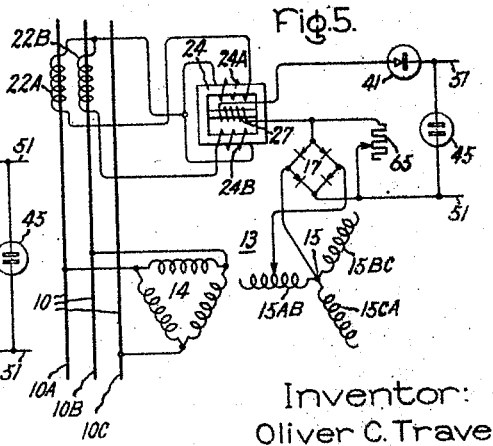
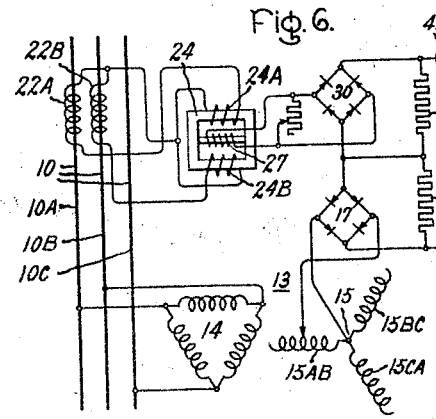
Inventor:
Oliver C. Traver,
by Harry E. Dunham
His Attorney.

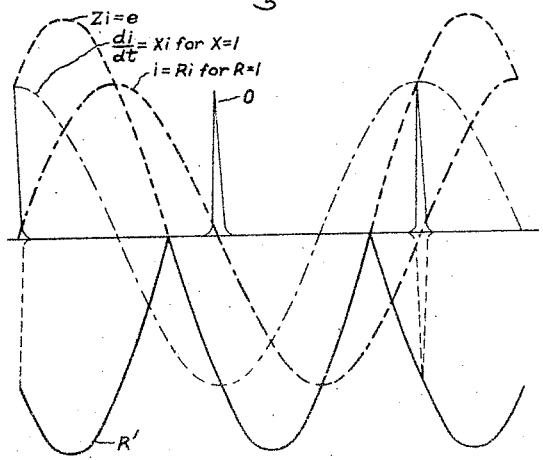
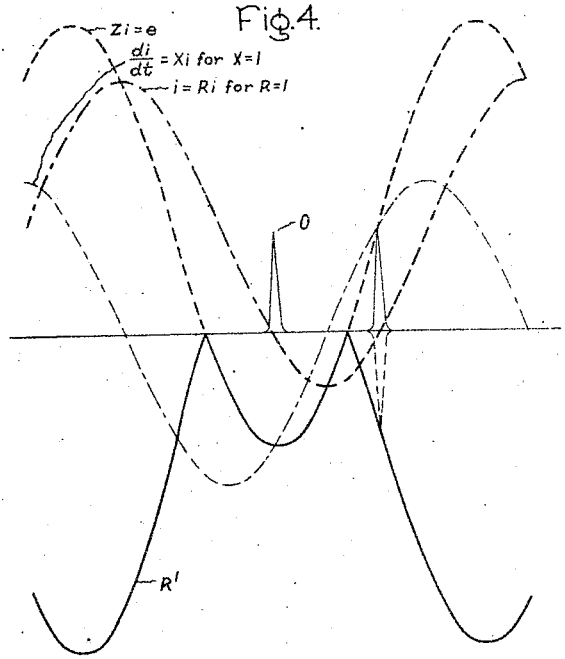

Aug. 7, 1945.  O. C. TRAVER  2,381,527
PROTECTIVE APPARATUS
Filed July 31, 1941  3 Sheets-Sheet 3
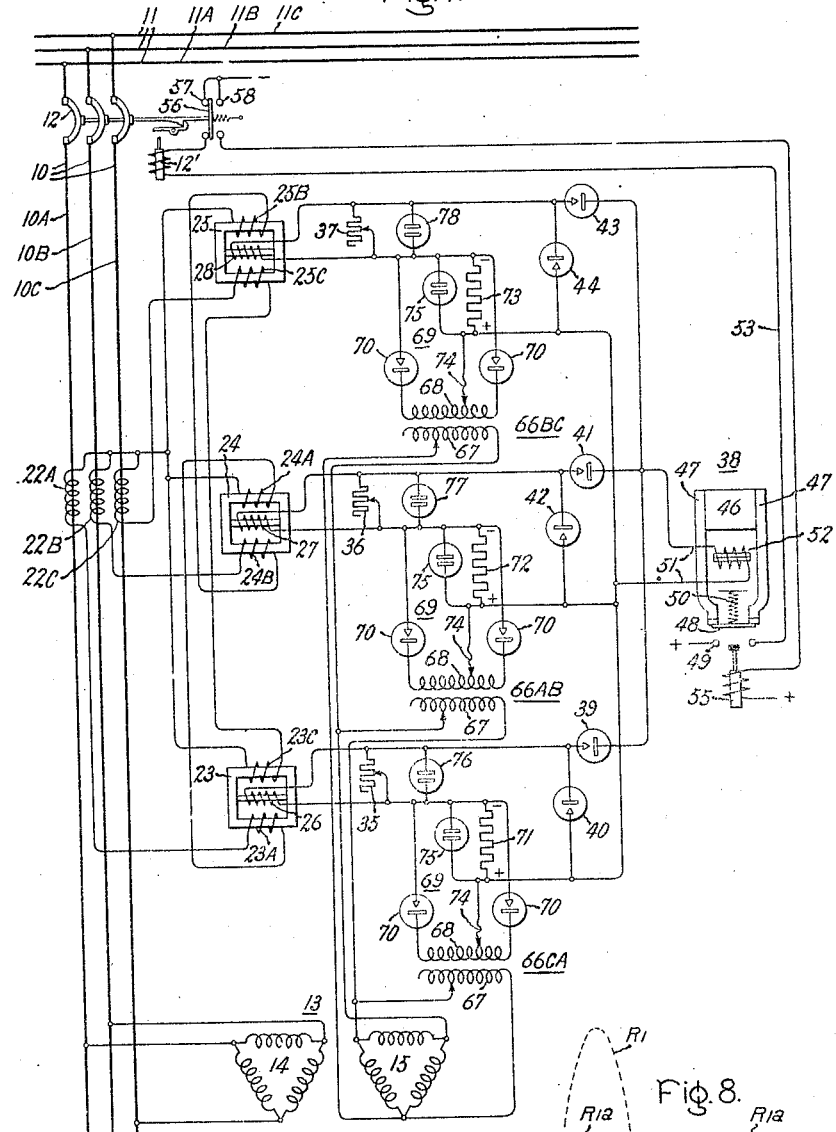
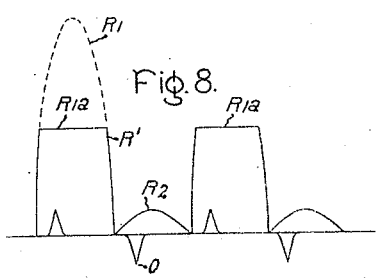
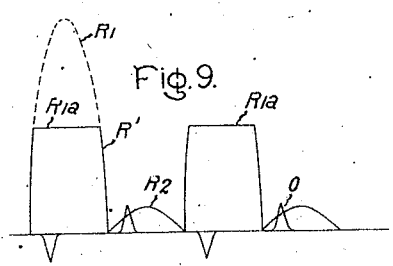
Inventor:
Oliver C. Traver,
by Harry E. Dunham
His Attorney.

Patented Aug. 7, 1945

2,381,527

UNITED STATES PATENT OFFICE 2,381,527

PROTECTIVE APPARATUS

Oliver C. Traver, Drexel Hill, Pa., assignor to General Electric Company, a corporation of New York Application July 31, 1941, Serial No. 404,866

19 Claims. (Cl. 175—294)

My invention relates to protective apparatus and more particularly to fault-responsive protective apparatus including distance relays whose operation is dependent upon a function of the current and a function of the voltage of a circuit so that the action thereof is based upon an impedance characteristic of the circuit.

This application is a continuation-in-part of my application, Serial No. 355,584, filed September 6, 1940, and assigned to the same assignee as the present application.

Distance relays consist of two general types—impedance relays and reactance relays. The former compares the magnitude of the voltage with that of the current, the ratio being the indicated impedance. When a fault occurs in a particular line section protected by an impedance relay, the impedance of that circuit is reduced to a point that will cause the relay to operate. Because of a considerable amount of arc resistance at the point of a fault, an impedance relay may operate improperly in that this arc resistance increases the circuit impedance beyond the value for a dead short circuit and, therefore, makes the fault appear more distant than it really is. To eliminate this difficulty, distance relays have been designed which depend upon reactance only for their operation and, since the voltage drop across the arc is practically entirely of a resistance character, substantially no error in distance measurement because of the arc drop is introduced in a reactance relay. Although certain phases of my invention are applicable to either impedance or reactance relays, my invention is more specifically concerned with distance relays of the reactance type.

Distance relays depending upon reactance for their operation, include a reactance-measuring element which is usually referred to as an ohmmeter or ohm unit. In some of the reactance relays of the prior art, current and voltage are applied to separate coils of the ohm unit so that a torque is exerted upon a movable system causing it to operate when the reactance of the circuit differs from a predetermined value. Relays of this kind, particularly for polyphase application, have been very complicated and, as a consequence, relatively expensive and, furthermore, due to inertia of the moving parts, have been far from the ultimate obtainable in high-speed operation, i. e., instantaneous in the sense of being operable in zero time.

With respect to the theory involved in ohmmeters of reactance-type distance relays, it is fundamental that the instantaneous voltage of a circuit containing resistance and inductance may be expressed by the well-known equation $$e = iR + L\frac{di}{dt}$$

Where $e$ and $i$ are instantaneous values of voltage and current respectively, $$\frac{di}{dt}$$

is the rate of change of current, L the inductance of the circuit, and R the resistance of the circuit. In an alternating current circuit at the instant the current passes through zero, the above equation reduces to the following:

$$e = L\frac{di}{dt}$$

Therefore, at the instant the current of the circuit is zero, the reactance of the circuit is proportional to $$\frac{e}{\frac{di}{dt}}$$

Based on these fundamentals, I provide an ohm unit for a reactance relay, the operation of which is dependent upon two voltages, one of which is proportional to the system voltage and the other of which is proportional to the rate of change of the system current, that is, $$\frac{di}{dt}$$

both of these voltages being active substantially at the instant the current of the circuit passes through the zero value. In the relay described herein, these two voltages are equal at the reactance value for which the relay is set to function. When the voltage proportional to the rate of change of current exceeds the voltage proportional to the system voltage, a fault is indicated as shown by the decreased reactance of the circuit and operation of the relay results. Specifically, my invention is an improvement on Patents 1,967,849 and 1,967,850, granted July 24, 1934, upon applications of Rolf Wideröe, and assigned to the same assignee as the present application.

In the copending United States application, Serial No. 355,579, filed September 6, 1940, on behalf of M. E. Bivens, now Patent No. 2,299,561 and assigned to the same assignee as the present application, there is disclosed and claimed a reactance relay in which the comparison between the voltages proportional to the system voltage and to the rate of change of current, respectively, are made at the zero point of the alternating-current wave by the utilization of a peaking transformer which provides the timing means for making such comparison. It would be desirable to provide a reactance relay in which the peaking transformer not only serves to time the intervals of comparison but, in addition, produces the voltage proportional to the rate of change of current which is compared with the voltage proportional to the system voltage.

It is an object of my invention to provide a protective system embodying a new and improved high-speed polyphase distance relay.

It is another object of my invention to provide a new and improved polyphase reactance relay in which a single relay element controls the protective apparatus.

It is another object of my invention to provide a protective system embodying a new and improved reactance relay which has a directional characteristic without the requirement of a separate starting unit.

Still another object of my invention is to provide a reactance relay in which the voltage proportional to the rate of change of current is obtained from a peaking transformer which permits a comparison with the voltage proportional to the system voltage only at substantially the zero point of the current wave.

Still another object of my invention is to provide a distance relay in which a single relay or relay device may be operated by any number of comparative units.

It is another object of my invention to provide a new and improved distance relay in which a comparison is made between two direct current voltages proportional respectively to the system voltage and the rate of change of system current.

Further objects and advantages of my invention will become apparent as the following description proceeds and the features of novelty which characterize my invention will be pointed out with particularity in the claims annexed to and forming a part of this specification.

For a better understanding of my invention, reference may be had to the accompanying drawings in which Fig. 1 is a schematic diagram of a protective system embodying my invention; Fig. 1a is a perspective view of one form of a portion of the apparatus used in the system of Fig. 1; Fig. 2 illustrates a modification of a portion of the apparatus of Fig. 1; Figs. 3 and 4 represent certain wave forms to aid in understanding the operation of Fig. 1; Figs. 5 and 6 represent modifications of portions of the protective apparatus illustrated in Fig. 1; Fig. 7 is a schematic diagram of a modified protective system embodying my invention; and Figs. 8 and 9 represent certain wave forms to aid in the understanding of the operation of the protective apparatus illustrated in Fig. 7.

Referring now to Fig. 1 of the drawings, I have illustrated a distance relay for protecting a line section 10, comprising three phase conductors 10A, 10B, and 10C, which is connected to a line section 11, comprising phase conductors 11A, 11B, and 11C, through latched closed circuit breaker 12 provided with a suitable trip coil 12' which, in turn, is controlled by the distance relay to be described hereinafter which depends for its action upon an impedance characteristic of the circuit comprising line section 10. In order to obtain a voltage proportional to the voltages of line section 10, I provide a potential transformer 13 indicated as having a delta-connected primary winding 14, so as to obtain line-to-line voltages, and three individual secondary windings 15CA, 15AB, and 15BC, schematically illustrated as provided with adjustable taps which, for convenience, are provided with a common terminal 15. The subscripts CA, AB, etc., refer to the particular phase conductors across which the voltage is taken. Each of the secondary windings 15CA, 15AB, and 15BC is arranged to energize one of a plurality of full-wave rectifiers 16, 17, and 18, respectively, across the unidirectional output of which are arranged resistors 19, 20, and 21. The unidirectional potential across resistors 19, 20, and 21 is proportional respectively to each of the different line-to-line voltages of three-phase circuit 10.

In order to obtain an electrical quantity proportional to the rate of change of current in line circuit 10, I provide a plurality of current transformers 22A, 22B, and 22C which are associated with their respective phase conductors 10A, 10B, and 10C. The secondary windings of current transformers 22A, 22B, and 22C are connected in Y relationship. A plurality of peaking transformers 23, 24, and 25 are provided to convert the quantity proportional to the system current to a quantity proportional to the rate of change of system current at the instant that the circuit current is passing through zero. The magnetic structure of these peaking transformers should preferably be like that of peaking transformer 23 shown in detail in Fig. 1a. In order that the electrical quantity proportional to the rate of change of system current at current zero may be properly compared with the voltages applied across rectifiers 16, 17, and 18, each of the peaking transformers 23, 24, and 25 is provided with a pair of primary windings wound on the outer legs thereof so that they may be energized with a corresponding current. Accordingly, peaking transformer 23 has primary windings 23A and 23C, the subscript denoting the specific phase conductor with which the current transformer 22A, 22B, or 22C energizing the particular windings is associated. Peaking transformer 24 is provided with primary windings 24B and 24A and peaking transformer 25 is provided with primary windings 25C and 25B. Each of the peaking transformers 23, 24, and 25 is provided with a secondary winding 26, 27, and 28, respectively, wound on the center saturable leg of the magnetic structure. Each secondary winding 26, 27, and 28 is connected across a full-wave rectifier 29, 30, and 31, respectively. The unidirectional output of rectifiers 29, 30, and 31 is impressed across resistors 32, 33, and 34, respectively, which, in turn, are connected in opposed voltage relationship with resistors 19, 20, and 21, connected across the rectifiers 16, 17, and 18 associated with potential transformer 13. It will be understood by those skilled in the art that the peaking transformers 23, 24, and 25 will be provided with the necessary shielding means between the primary and secondary windings and the necessary air gap shunt path for the primary flux not accepted in the saturable core section will be included.

In order to adjust the output of peaking transformers 23, 24, and 25, suitable adjustable resistors 35, 36, and 37 may be connected across the secondary windings 26, 27, and 28, respectively. The schematically indicated adjustable taps on the secondary windings 15AB, 15BC, and 15CA of potential transformer 13 are provided, whereby it is possible to use rectifiers of substantially the same design and rating to produce the unidirectional components proportional to the voltage of the system and proportional to the rate of change of current of the system at current zero. As will be explained hereinafter, the errors due to the nonlinear characteristic of rectifiers, such as those of the copper-oxide type, will not introduce errors, as was the case in connection with prior-art arrangements. In addition to using rectifiers of substantially the same design and rating, the resistors 19, 20, and 21, 32, 33, and 34 preferably have substantially the same ohmic value to load the rectifiers associated therewith to the same extent.

As is set forth in the copending application of M. E. Bivens referred to above, the output of peaking transformers 23, 24, and 25 is a very narrow peaked alternating wave the width of which is only a few electrical degrees. Furthermore, as will be understood by those skilled in the art, this peak occurs substantially at the zero point of the current wave and the amplitude of this peaked wave is proportional to the rate of change of current at the zero of the system current.

As in some of the distance relays of the prior art operating on an impedance characteristic of the system being protected, a potential proportional to the voltage of the circuit is used to restrain the operation of the means for isolating the circuit while the voltage proportional to the rate of change of circuit current is used to operate such means. Under normal conditions, these quantities oppose each other and it is only when a fault occurs within the protected area that the drop in reactance results to cause the operating voltage proportional to the rate of change of circuit current to overcome the restraining voltage proportional to the system voltage and, hence, cause operation of the means for isolating the faulted section of a system.

By connecting resistors 19 and 32, 20 and 33, and 21 and 34 so that the voltages impressed thereon oppose each other, a plurality of unidirectional voltages are obtained, one for each conductor of the polyphase circuit which may operate a suitable instantaneous relay whenever the reactance of the circuit decreases to a predetermined value. If desired, a separate relay may be provided for each set of electrical quantities compared but, as illustrated in Fig. 1 of the drawings, I prefer to use a single relay element to be operated by any number of comparative units. Accordingly, the potential across resistors 19 and 32 is connected across a suitable high speed relay 38 through a unidirectional conducting device 39 so that only a positive operating voltage can affect the relay. In order to relieve the reversed voltage stresses on the rectifiers 16 and 29, I provide a unidirectional conducting device 40 for by-passing the current due to the negative restraining or non-operating potentials existing across the resistors 19 and 32. Similarly, resistances 20 and 33 are connected to operate relay 38 through unidirectional conducting device 41, and a suitable unidirectional conducting device 42 is provided to by-pass the current due to the negative or restraining potentials so that they will not reach relay 38. Likewise resistances 21 and 34 are connected across relay 38 through unidirectional conducting device 43 and unidirectional conducting device 44 is provided to by-pass the current due to the restraining or nonoperating potential thereby to relieve the reversed voltage stresses on the apparatus. If desired, a suitable glow discharge valve 45 may be connected across relay 38. This glow discharge valve will operate only in case of faults which are very close to the distance relay and might cause excessive currents to flow through sensitive relay 38. Furthermore, this glow discharge valve 45 will not become conductive until the voltage is at least sufficiently high to cause operation of relay 38 but not high enough to cause damage thereto.

In order to obtain high-speed relay operation, I have illustrated relay 38 as of the so-called "flux-shifting" type disclosed and claimed in United States Letters Patent 2,130,871, granted September 20, 1938, upon an application of E. W. Boehne and assigned to the assignee of the present application. Relay 38 is illustrated as comprising a permanent magnet 46 having soft-iron pole pieces 47 and a coacting armature 48. The operation of the armature 48 controls the contacts 49 of the relay 38. The magnetomotive force produced by the permanent magnet 46 normally maintains the armature 48 in the closed magnetic circuit position shown against the bias of spring 50. When this magnetomotive force is overcome by the spring 50, the relay contacts 49 are closed. For the purpose of controlling the release of armature 48, a tripping coil 52 is provided, which is related to the magnetic circuit, above described, so that energization of coil 52 in a predetermined direction causes release of armature 48 and closing of contacts 49. It will, therefore, be apparent that closing of contacts 49 will result when a current of a predetermined direction flows from output circuit 51 leading from the different comparative units through tripping coil 52 of flux-shifting relay 38. In view of unidirectional conducting devices 39, 41, and 43, current cannot flow through winding 52 unless it is of the proper direction to cause operation of relay 38. The contacts 49 of the flux-shifting relay 38 are connected in a tripping circuit 53, which includes tripping coil 12' of circuit breaker 12 and the contacts 54 of a suitable starting unit, not shown, which causes closure of these contacts 54 when the power flow is in a certain direction so that the tripping of circuit breaker 12 will not occur unless the fault is in the section being protected.

In order to reset relay 38, a resetting circuit is provided which includes a solenoid-operated plunger 55 mounted directly below relay armature 48 and controlled by a suitable double-throw auxiliary switch 56 operated in dependence upon the position of circuit breaker 12. When circuit breaker 12 is closed, double-throw switch 56 bridges contacts 57 connected in series with tripping circuit 53. When circuit breaker 12 is open, on the other hand, double-throw switch 56 bridges contacts 58 to energize the resetting circuit of relay 38, whereupon solenoid 55 is energized to force armature 48 against pole pieces 47 which movement is opposed by the force of spring means 50.

It will be understood by those skilled in the art that flux-shifting relay 38 might be replaced by other suitable instantaneously operating relays and, in Fig. 2, I have shown an electronic relay 59 which may be substituted for relay 38 of Fig. 1. Electronic relay 59 is illustrated as comprising a suitable electric discharge valve 60, preferably of the vapor-discharge type, having an anode 61 and cathode 62, and a control electrode or grid 63. The output circuit 51 of the plurality of comparative units comprising the ohm meter or ohm unit of the reactance relay of Fig. 1 would be connected across the grid-to-cathode circuit of electric discharge valve 60 as designated by the same reference numeral 51 in Fig. 2. A suitable current-limiting resistor 64 and any necessary biasing means would be provided for this grid circuit. The corresponding parts of Fig. 2 are designated by the same reference numerals as in Fig. 1. Hence, the starting unit or directional relay contacts 54 and the auxiliary switch contacts 57 of switch 56 are connected in series with electric discharge valve 60. If a suitable positive potential is applied on the control electrode 63 of electric discharge valve 60, this valve will be rendered conductive to cause tripping of circuit breaker 12 if the directional relay contacts 54 are closed since the contacts 57 of auxiliary switch 56 would be closed when the circuit breaker 12 is closed.

The operation of the distance relay disclosed in Fig. 1 will be considered with respect to the wave forms illustrated in Figs. 3 and 4 which, for the sake of simplicity, show only the conditions existing in a single-phase circuit. Actually, for the three-phase system of Fig. 1, the number of curves to illustrate the conditions in all three-phase conductors would be tripled. Assuming symmetrical or steady-state current conditions in the circuit, as shown in Fig. 3, the alternating current flowing at a particular instant in any one of the phase conductors 10A, 10B, or 10C of power line 10 may be represented by the sine wave $i$ which also represents the in-phase voltage drop or resistance drop $Ri$ in this circuit, assuming a circuit resistance of one ohm. As will be understood by those skilled in the art, a wave representing the rate of change of current, $di/dt$, is obtained by drawing a sine wave which leads the current wave $i$ by ninety electrical degrees. The inductance reactance drop $Xi$ of the circuit leads the $Ri$ drop by ninety electrical degrees and, hence, is in phase with the $di/dt$ wave. If the reactance of the protected circuit is one ohm, then the $di/dt$ curve also represents the $Xi$ or reactance drop. Since the impedance drop $Zi$ of the circuit is the vectorial sum of the resistance and reactance drops ($Zi=Ri+Xi$), this $Zi$ drop is shown in Fig. 3 as $Zi$, the sum of the resistance and reactance drops and represents the voltage at the distance relay and, consequently, also the voltage impressed across one of the rectifiers 16, 17, or 18. The voltage appearing across one of the resistors 19, 20, or 21 is, therefore, the rectified value of the $Zi$ or impedance drop and is illustrated by the solid curve R' in Fig. 3 representing the restraining voltage which tends to prevent relay 38 from operating.

The operating voltage or rectified output of one of the peaking transformers 23, 24, or 25 is represented by the curve O shown in solid lines in Fig. 3, the magnitude of which is proportional to the magnitude of the $di/dt$ curve at substantially current zero since, as will be understood by those skilled in the art, the voltage peak occurs at that instant. As long as the operating voltages appearing across the resistors 32, 33, or 34, one of which is represented by the peaked wave O in Fig. 3, are equal to or less than the voltage appearing across the respective resistor 19, 20, or 21 represented by the curve R' in Fig. 3, at the instant the circuit current is zero, no current for operating relay 38 will be available. In view of the peaking transformers, the comparison between a restraining voltage R' proportional to the circuit voltage and an operating voltage O proportional to the rate of change of current is made twice every cycle at the zero of the circuit current so that a true measure of the circuit reactance is obtained. If a fault occurs at any place within the protected section, the operating voltage O will, of course, become larger than the restraining voltage R' and, at the first time the circuit current passes through zero, operation of relay 38 will obtain.

From an inspection of Fig. 3, it will be apparent that a change in power factor, such as a relative variation between the two voltage drops $Ri$ and $Xi$ will not change the operation of the protective system of Fig. 1. Since the $Ri$ or resistance drop is always zero when the circuit current is zero, it has no influence on the impedance drop or the voltage at the relay at that instant. Accordingly, the impedance or $Zi$ drop when the circuit current is zero will always have a fixed magnitude proportional to the reactance of the circuit herein assumed to be one ohm and to the rate of change of the circuit current at the instant the circuit current is zero and hence is entirely independent of power factor. Therefore if the resistance drop of the circuit varies during a fault so as to cause a change in the power factor, no error will be introduced insofar as the operation of the protective system embodying my invention is concerned. Having chosen a value of reactance of one ohm for the circuit, it is obvious from Fig. 3 that the balanced condition is one ohm reactance at any value of resistance.

The reactance relay described above will also function properly under transient conditions, for example, when the circuit current contains a direct current transient. The wave forms similar to those of Fig. 3 and designated by the same nomenclature for transient current conditions are illustrated in Fig. 4 where the current wave $i$ and correspondingly also the resistance drop represented by this same wave are displaced from the zero axis by virtue of a direct current component. However, there is no reactance drop obtained by virtue of this direct current component and hence the curve representing the rate of change of current $di/dt$, as will be understood by those skilled in the art, is symmetrical about the zero axis in spite of the displacement of the circuit current. The reactance drop $Xi$, when the circuit reactance is one ohm is also represented by the $di/dt$ curve. As in Fig. 3, it will be observed that the impedance drop $Zi$ representing the voltage at the relay, at the instant the circuit current is zero is equal to the reactance drop and, consequently, is not affected by the amount of displacement of the circuit current so as to cause incorrect operation of my reactance relay. This indicates, therefore, that my protective apparatus will operate in response to reactance values of the circuit only notwithstanding the presence of a direct current transient or a high value of circuit resistance due to the arc drop at the fault.

By the arrangement disclosed in Fig. 1 as mentioned above, the inaccuracy which affected the operation of prior art distance relays by virtue of the nonlinear characteristics of rectifiers has been substantiallly eliminated. Unlike the arrangements of the prior art, where one rectifier was energized from a current source while another rectifier was energized from a voltage source so that they were operating at entirely different portions of their operating curves, the rectifiers used to produce a direct current voltage proportional to the system voltage and the rectifiers used to produce a rectified voltage proportional to the rate of change of system current are by virtue of the peaking transformers all energized from a potential source. Accordingly if rectifiers of the same design and rating are used for the electrical quantities which are being compared and the resistance loadings thereof are substantially the same, then it is obvious that the rectifier inaccuracies must occur to the same degree at all points and, therefore, balance out over the entire range. It is, of course, obvious that the different rectifiers need not always be of the same size but the requirement is that each rectifier shall be operating under the same proportional conditions and that each bear the same degree of load as the other so as to have the same degree of inaccuracy under the full range of possible currents and voltages for the balance point of a given setting. In general there need be little concern for the relative accuracies at other than the balance point.

By designing the peaking transformers as illustrated in Figs. 1 and 1a, they will respond to equal inphase components of currents in the two primary windings thereof but will have very little tendency to respond to excitation of one of these primary windings alone as is the case when a line-to-line fault occurs on the system. If, for example, a fault occurred between phases A and B, then peaking transformer 24 should produce the desired peaked response while peaking transformers 23 and 25 should not produce any such effective response. Under such a fault condition it will be observed that primary windings 23A and 25B are energized with fault current while the primary windings 23C and 25C have no current or a very small amount of current flowing therein relative to the currents flowing in the other primary windings 23A and 25B respectively. The current flowing in windings 33A and 25B, however, will cause a flux to be produced in the enlarged portion of the magnetic structure, that is, the outer legs of the core due to the low reluctance of this path and will not cause any substantial amount of flux to flow through the saturable section of the core so as to produce any appreciable output across rectifiers 29 and 31, respectively. Thus, a proper response will be obtained by the above arrangement for line-to-line faults, double line-to-ground faults, three-phase faults, and single line-to-ground faults.

The resistors 32, 33, 34, 35, 36, and 37 should all be of a very high ohmic value as will be understood by those skilled in the art in order to maintain the burden on the current transformers 22A, 22B, and 22C at a minimum.

Since only the positive peak voltage with reference to Figs. 3 and 4 can cause operation of relay 38, it is possible to eliminate the full wave rectifiers 29, 30 and 31 of Fig. 1 whereby a comparison of the voltages proportional to the rate of change of current and the voltages proportional to the system voltage are made only once during each cycle. Accordingly, in Fig. 5, I have shown a portion of the apparatus of Fig. 1, the corresponding parts thereof being designated by the same reference numerals, in which the rectifier connected across the peaking transformer is eliminated and the ouput of the peaking transformer winding 27 is connected in series with an adjustable resistor 65 which loads rectifier 17. Appropriate adjustments of the electrical quantities to be compared can readily be made by virtue of the adjustable taps on the secondary windings of the transformer 13 and adjustable resistor 65. The operation of the distance relay a portion of which is illustrated in Fig. 5 will be obvious to those skilled in the art in view of the detailed description set forth above.

As was mentioned above, the unidirectional conducting devices 40, 42 and 44 may be eliminated if the reverse potential will not cause undue voltage stresses and, accordingly, in Fig. 6 I have illustrated a portion of the circuit of Fig. 1, the corresponding parts thereof being designated by the same reference numerals, in which these unidirectional conducting devices are eliminated.

In the reactance type of distance relay described above, it is often necessary to include a directional or starting element which controls the contacts 54 referred to above since otherwise the relay might operate for either direction of power flow whether the fault were in the protected section or outside the protected section. In Fig. 7, I have shown a reactance type of distance relay in which the ohm unit, itself, has directional characteristics so that it is not necessary to provide an additional starting or directional unit as is the case in connection with Fig. 1. The corresponding parts of Fig. 7 are designated by the same reference numerals as in Figs. 1, 5, and 6.

As in Fig. 1, in order to obtain the voltage proportional to the system voltage, I have illustrated a potential transformer 13 which may be provided with a delta-connected primary winding 14 associated with power line 10, and if desired a delta-connected secondary winding 15 from which the proper line-to-line voltage for each of the three comparative units may be obtained through adjustable ratio transformers 66CA, 66AB, and 66BC, respectively, the subscripts denoting the particular line-to-line voltage involved. Each of these transformers 66CA, 66AB, and 66BC is provided with an adjustable tap primary winding 67 and a secondary winding 68, which forms part of a biphase rectifier circuit 69. Each of these biphase rectifier circuits comprises a pair of electric discharge valves 70 having the cathodes thereof associated with the terminals of secondary windings 68. The anodes of electric discharge valves 70 are connected to the negative end of a suitable resistor 71, 72, or 73, depending on which comparative unit is being considered. The positive end of resistor 71, 72, or 73 is connected through an adjustable tap 74 to an intermediate terminal on the secondary winding 68 of variable ratio transformer 66CA, 66AB or 66BC. The variable tap 74 is purposely connected at some other point than the midpoint of secondary winding 68 so that the alternate half cycles of the rectified alternating-current voltage are of considerably different magnitudes similar to the portions $R_1$ and $R_2$ of the restraining voltage curve shown in Figs. 8 and 9. For purposes which will be discussed hereinafter, these restraining voltages are shown above the zero axis rather than below the zero axis as they actually are and as they are shown in Figs. 3 and 4. In order that this large restraining voltage which is really a blocking voltage may block the operation of the relay for every alternate half cycle of the alternating-current wave and yet not have a dangerously high peak value, glow discharge valves 75 are connected across each of the respective resistors 71, 72, and 73 so that actually the blocking alternate half cycles of the rectified restraining voltage R' shown in Figs. 8 and 9 as $R_{1a}$ are substantially square topped waves of a magnitude sufficient to prevent relay 38 from being energized.

As in Fig. 5, no rectifier is provided for rectifying the output of the peaking transformers 23, 24, and 25. However, glow discharge valves 76, 77, and 78 are connected across the output of each of these peaking transformers so as definitely to limit this peak to some value less than the magnitude of the square-top alternate half cycles of restraining voltage $R_{1a}$ illustrated in Figs. 8 and 9. In other words, by this arrangement, over the working range of the equipment, the operation of relay 38 is definitely blocked during one-half cycle and operation thereof can only occur during the other half cycle if the operating voltage represented by the output of the peaking transformer exceeds the restraining voltage $R_2$.

The operation of the arrangement disclosed in Fig. 7 will be understood by referring to Figs. 8 and 9. It should be remembered that the restraining voltage represented by the curve R' actually has a negative value but is shown above the zero axis in order to compare it with the operating voltage. With the particular direction of current flow in power circuit 10, the operating voltage represented by the peaked wave O of Fig. 8 cannot cause operation of relay 38 since, due to glow discharge valves 76, 77, and 78, the positive peak can never exceed the portion $R_{1a}$ of the restraining voltage curve R' and, of course, the negative half cycle of this peak voltage is in the restraining direction. It will be obvious, therefore, that, for one direction of current flow, relay 38 cannot be energized. For the other direction of power flow, on the other hand, referring to Fig. 9, the positive half cycles of the peak operating voltage occur during the non-blocking half cycle of the restraining voltage $R_{1a}$ and, if this operating voltage exceeds the restraining voltage $R_2$ as shown in Fig. 9, relay 38 will be operated. From the above discussion, it will be obvious that the arrangement disclosed in Fig. 7 comprises a reactance type of distance relay inherently having directional action without the requirement of a starting or directional unit.

It will be understood by those skilled in the art that, while I have illustrated and described certain particular embodiments of my invention, modifications thereof will occur to those skilled in the art. I desire it to be understood therefore that my invention will not be limited to the particular arrangements disclosed and I intend in the appended claims to cover all modifications and changes which fall within the true spirit and scope of my invention.

What I claim as new and desire to secure by Letters Patent of the United States, is:

1. In an arrangement for controlling circuit-interrupting means in an electric circuit, the combination of means including a peaking transformer for deriving from said circuit a voltage having a wave form comprising spaced narrow peaks and respectively dependent upon an electrical quantity of said circuit, means for deriving a second voltage proportional to a different electrical quantity of said circuit, and means for controlling said circuit-interrupting means in accordance with the balance between said two voltages.

2. In an arrangement for controlling circuit-interrupting means in an electric circuit, the combination of means including a peaking transformer for deriving from said circuit a voltage respectively dependent upon the rate of change of current of said circuit, means for deriving a second voltage proportional to the alternating potential of said circuit and means for controlling said circuit-interrupting means in accordance with the balance between said two voltages, said peaking transformer being so constructed and arranged as to produce a voltage output only substantially at the moment the circuit current is passing through its zero value.

3. In an arrangement for controlling circuit-interrupting means in an electric circuit, the combination of means for deriving from said circuit two direct-current voltages respectively dependent on the rate of change of the circuit current and on the circuit voltage, electro-responsive means for controlling said circuit-interrupting means in accordance with the balance between said two voltages, said voltage responsive to the rate of change of the circuit current being obtained from a peaking transformer associated with said circuit so that control of said electro-responsive means is obtained only at the moment the circuit current is passing through its zero value.

4. In an arrangement for controlling circuit-interrupting means in an electric circuit, the combination of means including a peaking transformer for deriving from said circuit a voltage respectively dependent upon the rate of change of current of said circuit, means for deriving a second voltage proportional to the alternating potential of said circuit, and means for controlling said circuit-interrupting means in response to the comparative values of said two voltages, said last-mentioned means being operative only at a predetermined instant during said alternating-current cycle when a potential output is obtained from said peaking transformer.

5. In an arrangement for controlling circuit-interrupting means in an electric circuit, the combination of means including a peaking transformer for deriving from said circuit a voltage respectively dependent upon the rate of change of current of said circuit, means for deriving a second voltage proportional to the alternating potential of said circuit, and electroresponsive means operable whenever said first-mentioned voltage exceeds said second voltage in value, said electroresponsive means being operated only at a predetermined instant during said cycle at the zero of the circuit current when a voltage output is obtainable across said peaking transformer.

6. In an arrangement for controlling circuit-interrupting means in an electric circuit, the combination of means for deriving from said circuit two alternating voltages respectively dependent upon the rate of change of the circuit current and on the circuit voltage, rectifying means of substantially the same design and rating for converting each of said alternating-current voltages to a unidirectional voltage, a pair of resistors of substantially the same ohmic value, one of which is connected across the unidirectional output of each of said rectifying means, said resistors being connected in series relationship so that said unidirectional voltages are in opposed relationship for comparative purposes, and an electroresponsive device connected across said resistors for controlling said circuit-interrupting means, said electroresponsive device being operated whenever the unidirectional voltage proportional to the rate of change of current exceeds the unidirectional voltage proportional to the circuit voltage.

7. In an arrangement for controlling circuit-interrupting means in an electric circuit, the combination of means for deriving from said circuit two alternating voltages respectively dependent upon the rate of change of the circuit current and on the circuit voltage, rectifying means of substantially the same design and rating for converting each of said alternating voltages to a unidirectional voltage, said rectifying means being so constructed and arranged that said unidirectional voltages are in opposed relationship for comparative purposes, and an electro-responsive device for operating said circuit-interrupting means whenever the unidirectional voltage proportional to the rate of change of current exceeds the unidirectional voltage proportional to the circuit voltage.

8. In an arrangement for controlling circuit-interrupting means in an electric circuit, the combination of means including a peaking transformer for deriving from said circuit an alternating voltage respectively dependent upon an electrical quantity of said circuit, means for deriving a second alternating voltage proportional to a different electrical quantity of said circuit, rectifying means of substantially the same design and rating for converting each of said alternating voltages to unidirectional voltages proportional to said electrical quantities of said circuit, and an electroresponsive device for controlling said circuit-interrupting means in accordance with the balance between said unidirectional voltages.

9. In an arrangement for controlling circuit-interrupting means in an $n$-phase alternating-current electric circuit fault-responsive protective means comprising $n$ comparative units of the static type each arranged to compare two different electrical quantities of said alternating-current circuit, said fault-responsive means including a single electroresponsive device for controlling said circuit-interrupting means whenever any one of said comparative units indicates a fault on said circuit.

10. In an arrangement for controlling circuit-interrupting means in a three-phase alternating-current electric circuit, a distance relay of the reactance type comprising three static comparative units each arranged to compare two different electrical quantities of said alternating-current circuit, said distance relay including a single electroresponsive device of the flux-shifting type for controlling said circuit-interrupting means whenever any one of said comparative units indicates a fault on said three-phase circuit.

11. In an arrangement for controlling circuit-interrupting means in an $n$-phase alternating-current electric circuit, a reactance relay comprising $n$ static comparative units each arranged to compare two different voltages, one proportional to the rate of change of the current of said circuit and the other proportional to the voltage of said circuit, said reactance relay including a single electroresponsive device of the electronic type for controlling said circuit-interrupting means whenever any one of said comparative units indicates a fault on said circuit.

12. In an arrangement for controlling circuit-interrupting means in an $n$-phase alternating-current electric circuit, a reactance relay comprising $n$ comparative units each arranged to compare two different voltages, one proportional to the rate of change of the current of said circuit and the other proportional to the voltage of said circuit, said reactance relay including a single electroresponsive device for controlling said circuit-interrupting means whenever any one of said comparative units indicates a fault on said circuit, and unidirectional conducting means associated with said comparative units for permitting only electrical quantities which indicate a fault on said circuit from affecting said electroresponsive device.

13. In an arrangement for controlling circuit-interrupting means in an electric circuit, the combination of a distance relay of the reactance type comprising means including a peaking transformer for deriving from said circuit a voltage respectively dependent upon the rate of change of current of said circuit, means for deriving a second voltage proportional to the alternating potential of said circuit, and means for controlling said circuit-interrupting means in accordance with the reactance of said circuit as determined by the balance between said two voltages, and adjustable means for varying the reactance setting of said relay.

14. In an arrangement for controlling circuit-interrupting means in an electric circuit, the combination of means including a peaking transformer for deriving an operating alternating voltage dependent on the rate of change of circuit current of said circuit and a rectified restraining voltage dependent on the alternating voltage of said circuit, electroresponsive means for operating said circuit interrupting means when said operating voltage is greater in magnitude than said restraining voltage, and means for preventing said operating voltage from exceeding said restraining voltage during alternate half cycles of said circuit voltage so that operation of said circuit-interrupting means can occur only when the power flow in said circuit is in a predetermined direction.

15. For use with an alternating-current electric circuit, an arrangement comprising means for deriving from said circuit an instantaneous alternating-current voltage dependent upon a function of an electrical quantity of said circuit, means for deriving at a predetermined point in the cycle of a predetermined electrical quantity of said circuit a peaked voltage dependent upon a function of an electrical quantity of said circuit, and means responsive to a predetermined function of said voltages.

16. For use with an alternating-current electric circuit, an arrangement comprising means for deriving from said circuit an instantaneous alternating-current voltage dependent upon a function of an electrical quantity of said circuit, means for deriving at a predetermined point in the cycle of a predetermined electrical quantity of said circuit a peaked voltage dependent upon a function of an electrical quantity of said circuit, and means responsive to the relative magnitudes of said voltages at said predetermined point.

17. In an arrangement for controlling circuit-interrupting means in an electric circuit, fault-responsive protective means including an electroresponsive device comprising a plurality of comparative units each functioning to impose a potential of one polarity on said electroresponsive device under a particular electrical condition of said electric circuit and to impose a potential of another polarity on said electroresponsive device under other conditions of said electric circuit, and unidirectional conducting means for permitting the potential of said one polarity to affect the operation of said electroresponsive device and for substantially preventing the potential of said other polarity from affecting said electroresponsive device.

18. In an arrangement for controlling circuit-interrupting means in an electric circuit, the combination of means including a transformer having a plurality of primary windings arranged to cause said transformer to respond to equal in-phase components of currents in said primary windings but to have little tendency to respond to the excitation of one of these primary windings alone for deriving from said circuit a voltage respectively dependent upon the rate of change of current of said circuit, means for deriving a second voltage proportional to the alternating potential of said circuit, and means for controlling said circuit-interrupting means in response to the comparative values of said two voltages.

19. A protective arrangement for an alternating current circuit comprising means for deriving from said circuit two alternating voltages respectively dependent upon the rate of change of the circuit current and on the circuit voltage, rectifying means for converting each of said alternating voltages to a unidirectional voltage, and protective means responsive to a predetermined relationship between the magnitudes of said unidirectional voltages.

OLIVER C. TRAVER.